US007380711B2

(12) United States Patent
Simon et al.

(10) Patent No.: US 7,380,711 B2
(45) Date of Patent: Jun. 3, 2008

(54) SELF-CHECK SYSTEM AND METHOD FOR PROTECTING DIGITAL MEDIA

(75) Inventors: Paul Simon, Princeton Junction, NJ (US); Paul A. Roberts, Collingswood, NJ (US)

(73) Assignee: Checkpoint Systems, Inc., Thorofare, NJ (US)

( * ) Notice: Subject to any disclaimer, the term of this patent is extended or adjusted under 35 U.S.C. 154(b) by 594 days.

(21) Appl. No.: 11/154,252

(22) Filed: Jun. 16, 2005

(65) Prior Publication Data

US 2006/0016885 A1 Jan. 26, 2006

Related U.S. Application Data

(60) Provisional application No. 60/590,548, filed on Jul. 23, 2004.

(51) Int. Cl.
*G06K 15/00* (2006.01)

(52) U.S. Cl. ...................... 235/383; 235/385; 235/439; 235/492

(58) Field of Classification Search ................ 235/383, 235/385, 435, 439, 449, 492; 340/572.1
See application file for complete search history.

(56) References Cited

U.S. PATENT DOCUMENTS

| | | | |
|---|---|---|---|
| 3,696,379 A | 10/1972 | Minasy | |
| 5,081,446 A | 1/1992 | Gill et al. | |
| 5,341,125 A | 8/1994 | Plonsky et al. | |
| 5,469,142 A | 11/1995 | Bergman et al. | |
| 5,594,228 A | 1/1997 | Swartz et al. | |
| 5,963,134 A | 10/1999 | Bowers et al. | |
| 5,988,376 A | 11/1999 | Lax | |
| 6,025,780 A | 2/2000 | Bowers et al. | |
| 6,154,135 A | 11/2000 | Kane et al. | |
| 6,169,483 B1 | 1/2001 | Ghaffari et al. | |
| 6,195,006 B1 | 2/2001 | Bowers et al. | |
| 6,333,692 B1 | 12/2001 | Anderson et al. | |
| 6,438,447 B1 | 8/2002 | Belka et al. | |
| 6,474,470 B2 * | 11/2002 | Byrne et al. | 206/308.2 |
| 6,486,780 B1 | 11/2002 | Garber et al. | |
| 6,598,791 B2 | 7/2003 | Bellis, Jr. et al. | |
| 6,693,539 B2 | 2/2004 | Bowers et al. | |
| 6,857,567 B2 | 2/2005 | Latimer et al. | |

(Continued)

FOREIGN PATENT DOCUMENTS

EP 372716 4/1990

(Continued)

OTHER PUBLICATIONS

International Search Report dated Mar. 1, 2006 for corresponding PCT/US2005/025809.

(Continued)

*Primary Examiner*—Seung H Lee
(74) *Attorney, Agent, or Firm*—Caesar, Revise, Bernstein, Cohen & Pokotilow, Ltd.

(57) ABSTRACT

A system and method for renting or purchasing products, preferably digital media. The system comprises a self-check station and unique locking apparatus for the media. The method includes a procedure to both rent and return the media without the aid of borrowing facility personnel.

41 Claims, 13 Drawing Sheets

U.S. PATENT DOCUMENTS

| | | | |
|---|---|---|---|
| 2001/0016800 | A1 | 8/2001 | Koh et al. |
| 2002/0096564 | A1 | 7/2002 | Bellis, Jr. et al. |
| 2002/0123932 | A1* | 9/2002 | Brenhouse .................. 705/16 |
| 2003/0075602 | A1 | 4/2003 | Wike et al. |
| 2003/0094021 | A1 | 5/2003 | Takinami |
| 2004/0254676 | A1* | 12/2004 | Blust et al. ................. 700/231 |

FOREIGN PATENT DOCUMENTS

| | | |
|---|---|---|
| WO | 99/53435 | 10/1999 |
| WO | 02/071346 | 9/2002 |

OTHER PUBLICATIONS

"Integral Security Packaging", Clear-Vu, http://www.clear-vu.com/detail.cfm?itemid=5, Oct. 12, 2005.

"Intelligent Library System Circulation Circuit", Checkpoint Systems, Inc., 2003.

"Necchi Safers", Checkpoint Meto, http://www.checkpointeurope.com/app/?topsection=productgroup&topsectionid=36&locale=eu&page=groupproduct&id=1331, Oct. 12, 2005.

* cited by examiner

FIG. 3
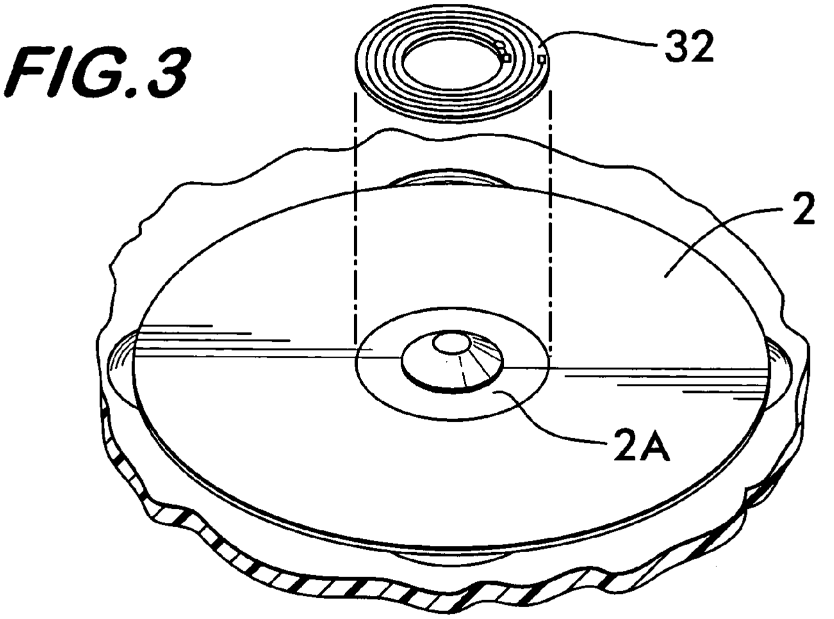
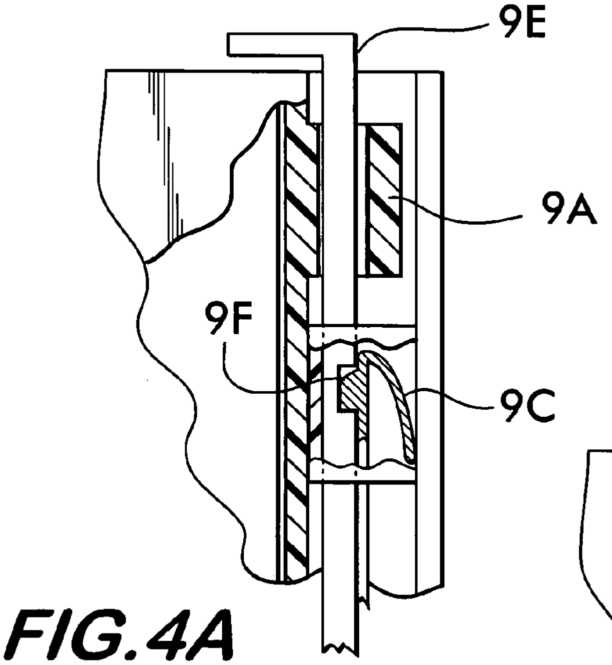
FIG. 4A
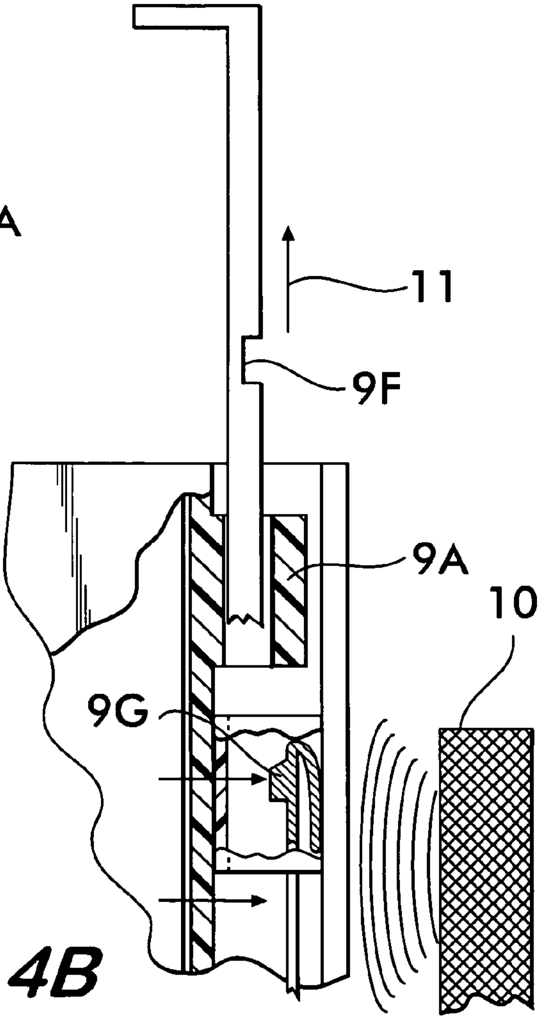
FIG. 4B

FIG.5A
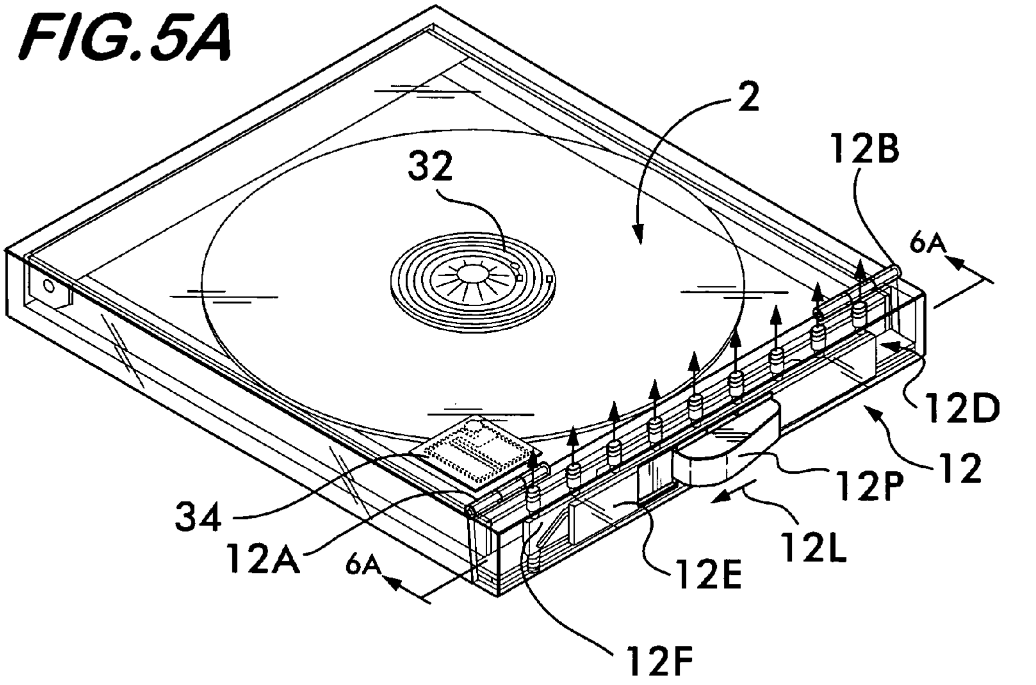
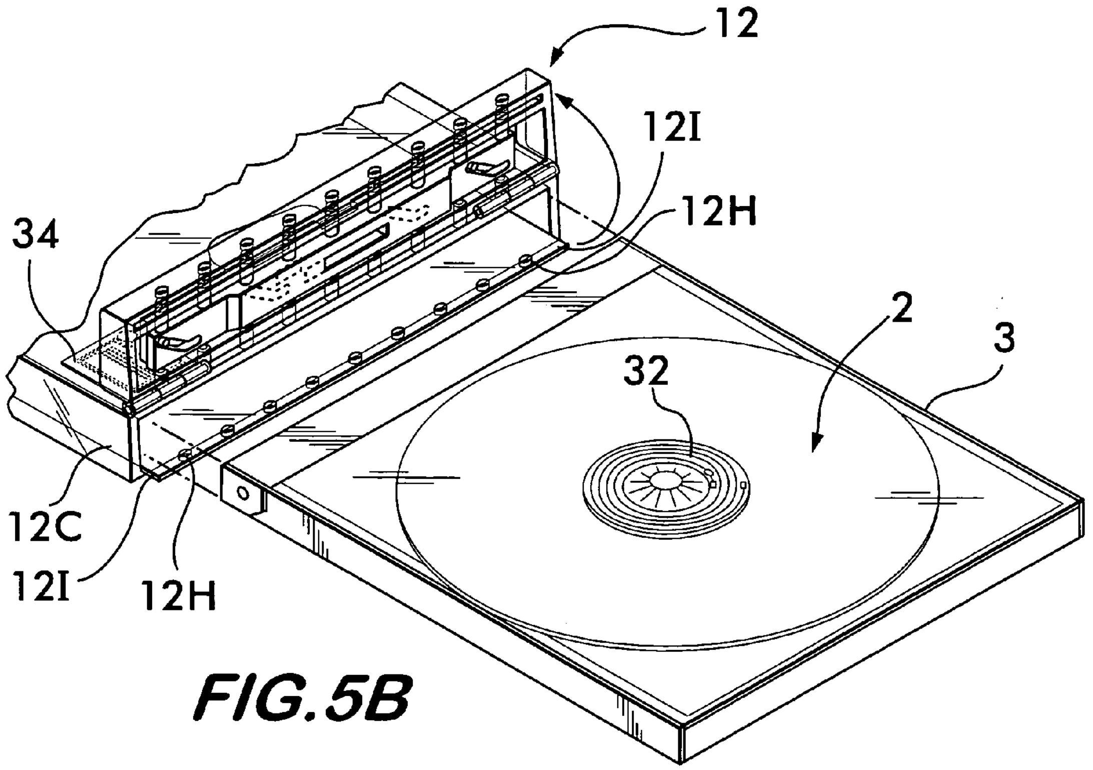
FIG.5B

FIG. 7A
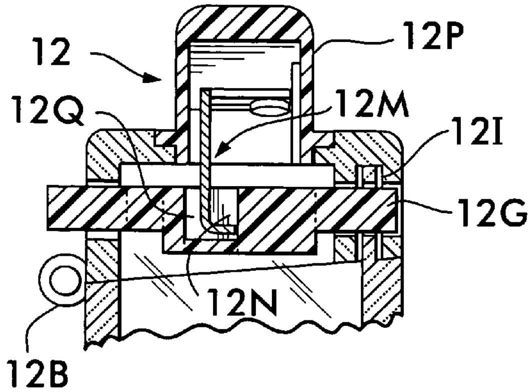
FIG. 7B
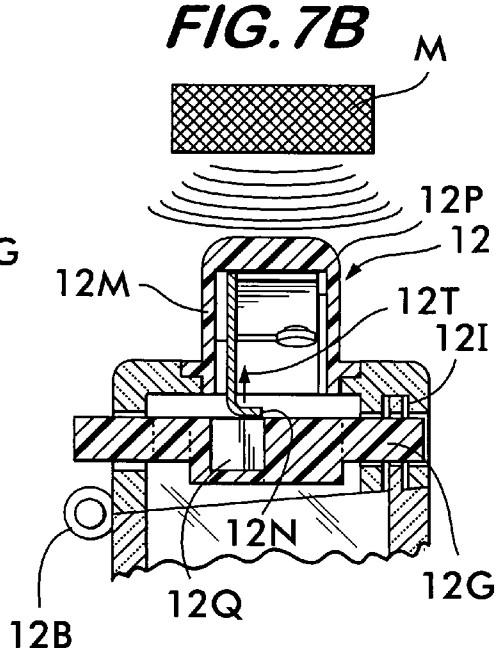
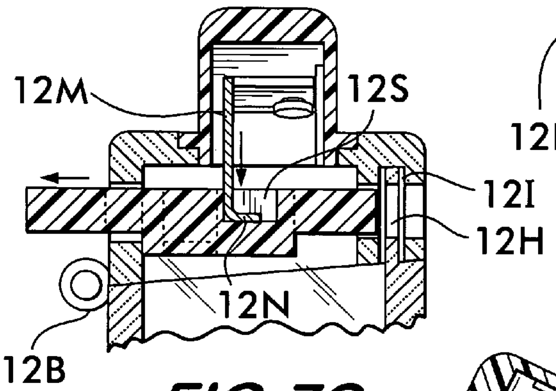
FIG. 7C
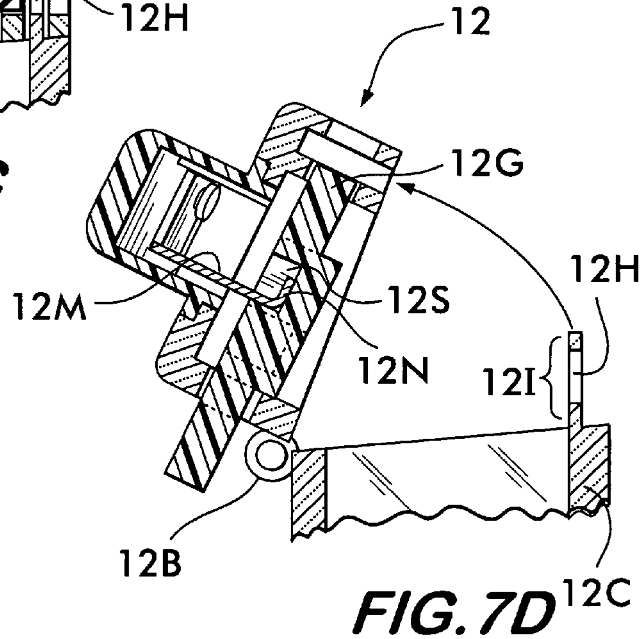
FIG. 7D

| DIGITAL MEDIA ID | SECURITY BOX ID | STATUS -VALID -INVALID | PATRON ID | DATE/TIME OF RENTAL | DATE/TIME RETURNED |
|---|---|---|---|---|---|
| | | | | | |

DATABASE ENTRY TABLE

SELF-CHECK SYSTEM AND METHOD FOR PROTECTING DIGITAL MEDIA

CROSS-REFERENCE TO RELATED APPLICATIONS

This utility application claims the benefit under 35 U.S.C. §119(e) of Provisional Application Ser. No. 60/590,548 filed on Jul. 23, 2004 entitled SELF-CHECK SYSTEM AND METHOD FOR PROTECTING DIGITAL MEDIA and whose entire disclosure is incorporated by reference herein.

BACKGROUND OF THE INVENTION

Field of Invention

This invention relates to collection management and theft deterrent systems. This invention improves the mechanism in which products are secured within a borrowing facility. More specifically, the invention removes the requirement for a clerk to remove security devices on the product so that the product can be sold, rented or borrowed.

Currently, there are many known security mechanisms which help deter the theft of a product from a borrowing facility. Security tags play a major role in inventory control to help prevent theft or "shrinkage" of inventory. Basic security tags such as disclosed in U.S. Pat. No. 3,696,379 (Minasy) discloses a passive tag that is energized by an electromagnetic field when the tag is brought into the range of a set of antennas. The antennas are customarily placed at the exits of the borrowing facility. Once the activated tag is brought into the field of antennas, the antennas then initiate an event, such as flashing lights, sounding an alarm, or logging an item-specific identifier. Conventionally, the tags are placed onto the media's packaging. This technology has limited use in digital media since the packaging has little or no value. The media itself can be taken without sounding any alarms. EAS (electronic article surveillance) tags are a type of tag that has two statuses, on or off. A normally functioning EAS tag is always on. Thus, when the tag is brought within range of an antenna, the tag is activated by the antenna and returns a signal to the antenna. There are only two ways to turn off the tag: either physically destroy the tag (EMP (electromagnetic pulse), magnetic energy, etc.) or block the tag with a detuning material so it cannot be activated.

Two products are known in the industry, which help protect facilities against this problem. They are generically referred to as "security boxes." One version is sold under the name of SAFER™ (by Checkpoint Systems, Inc. of Thorofare, N.J.) and one is sold under the name of "Clear Vu" (by Clear-Vu of Westbury, N.Y.). These security boxes essentially lock an item (e.g., digital media such as CD (compact disc) ROM (read-only memory), DVD (digital video disc), etc.) in a box and require an unlocking mechanism to remove the item from the box. When this technology is combined with an internal security tag, an effective theft deterrent system is established. The box cannot be opened to remove the media, and the box will sound an alarm if it is brought into range of the antennas. Typically, this technology is employed with EAS tags, where the tagged security box is passed around the antennas so the media can be given to the patron. Any size item can be stored inside the box, but typically most items occupy a considerable portion of the box's internal volume.

The combined security tag and security boxes have several known shortcomings. The borrowing facility has difficulty taking inventory of the item in the security box since the contents cannot easily be visually inspected to determine what the box contains. Additionally, this system still requires an employee to manually check out the media since the employee needs to log which media is being rented or sold, and the employee must pass the media around the antennas or place a detuning device to the tag. This results in longer lines in borrowing facilities, and more employees working at check-out registers. If the security tag is located on the packaging of the product case, the clerk must remove the security box and pass the loaned material around the antenna or place a detuning material over the tag.

One other problem that patrons who rent digital media may encounter is the accrual of late fees even though they are certain that they returned the digital media to the borrowed facility well before the return time deadline. Some of this can be attributed to the employees actually taking the returned digital media and then viewing it themselves and then entering the return time of the digital media after the deadline. Without any way to verify this, the patron has no recourse but to pay the late fee.

Thus there is a long felt need to allow for an automated check-out/in system that would track which media is being rented, allow for secure interrogation of the item and provide for verified return time of rented digital media by patrons.

All references cited herein are incorporated herein by reference in their entireties

BRIEF SUMMARY OF THE INVENTION

An automated check-out system for digital media (e.g., a compact disk or digital video disk, etc.) located in a facility where the digital media is sold to, or rented by, patrons. The system comprises: a content tag (e.g., an RFID tag) secured to the digital media for containing identification data (e.g., title, author, serial number, etc.) of the digital media; and a security box into which the digital media is disposed, and wherein the security box comprises a releasable lock that precludes access to the digital media contained therein until the releasable lock is unlocked; a check-out station comprising: at least one tag reader for obtaining the identification data from the content tag; a computer coupled to a database, wherein the database associates the digital media with patron identification; a point of sale device, coupled to the computer, that permits the patron to tender payment for purchasing or renting the digital media, wherein the computer modifies a status identifier of the digital media stored on the database based on the payment; an unlocker (e.g., a magnet or electromagnet) coupled to the computer, and wherein the computer activates the unlocker whenever payment occurs; and pedestals, located at the exit of the facility, and coupled to the computer for detecting the presence of the content tag; and an alarm, coupled to the computer, that activates whenever the content tag is detected at the pedestals and the status identifier has not been modified.

An automated check-out system for digital media (e.g., a compact disk or digital video disk, etc.) located in a facility where the digital media is sold to, or rented by, patrons. The system comprises: a content tag (e.g., an RFID tag) secured to the digital media for containing identification data (e.g., title, author, serial number, etc.) of the digital media; and a security box into which the digital media is disposed, and wherein the security box comprises a security tag (e.g., an RFID tag) and a releasable lock, wherein the releasable lock precludes access to the digital media contained therein until the releasable lock is unlocked; a check-out station comprising: a first tag reader for obtaining the identification data from the content tag; a computer coupled to a database, wherein the database associate the digital media with patron identification; a point of sale device, coupled to the computer, that permits the patron to tender payment for purchasing or renting the digital media, wherein the computer modifies a status identifier of the digital media stored on the database based on the payment; an unlocker (e.g., a magnet or electromagnet) coupled to the computer, wherein the computer activates the unlocker whenever payment occurs; and pedestals, located at the exit the facility, and coupled to the computer for detecting the presence of the security tag; and an alarm, coupled to the computer, that activates whenever the security tag is detected at the pedestals and the status identifier has not been modified.

A method for permitting a patron to automatically check-out digital media (e.g., compact disks, digital video disks, etc.) located in a facility where the digital media is sold or rentable. The method comprises the steps of: securing a content tag (e.g., RFID tag) to the digital media for containing identification data (e.g., title, author, serial number, etc.) of the digital media therein and providing pedestals at an exit of the facility that can detect the passage of the content tag therethrough; providing an alarm that can be activated when the pedestals detect the passage of the content tag therethrough; disposing the digital media into a security box having a releasable lock that precludes access to the digital media contained therein until the releasable lock is unlocked; wirelessly obtaining (e.g., RFID reader, etc.) the identification data from the content tag by the patron; obtaining patron identification data from the patron and associating the identification data with the patron identification data in a database; receiving payment from the patron to either rent or purchase the digital media; modifying a status identifier of the rented or purchased digital media stored on the database based on the payment and unlocking the releasable lock based on the payment; deactivating the alarm when the pedestals detect the passage of the content tag therethrough and when the status identifier has been modified, or activating the alarm when the pedestals detect the passage of the content tag therethrough and when the status identifier has not been modified. A method for permitting a patron to automatically check-out digital media (e.g., compact disks, digital video disks, etc.) located in a facility where the digital media is sold or rentable. The method comprises the steps of: securing a content tag (e.g., RFID tag) to the digital media for containing identification data (e.g., title, author, serial number, etc.) of the digital media therein and providing pedestals at an exit of the facility; disposing the digital media into a security box having a releasable lock that precludes access to the digital media contained therein until the releasable lock is unlocked, and wherein the security box also comprises a security tag (e.g., RFID tag); providing an alarm that can be activated when the pedestals detect the passage of the security tag therethrough; wirelessly obtaining (e.g., RFID reader, etc.) the identification data from the content tag by the patron; obtaining patron identification data from the patron and associating the identification data with the patron identification data in a database; receiving payment from the patron to either rent or purchase the digital media; modifying a status identifier of the rented or purchased digital media stored on the database based on the payment and unlocking the releasable lock based on the payment; deactivating the alarm when the pedestals detect the passage of the security tag therethrough and when the status identifier has been modified, or activating the alarm when the pedestals detect the passage of the security tag therethrough and when the status identifier has not been modified.

BRIEF DESCRIPTION OF SEVERAL VIEWS OF THE DRAWINGS

The invention will be described in conjunction with the following drawings in which like reference numerals designate like elements and wherein:

FIG. 3 depicts an exploded view showing an exemplary annular RFID tag for use with digital media;

FIG. 4A is an enlargement of an exemplary releasable locking mechanism for the security box shown in FIG. 2 and showing the releasable locking mechanism in locked condition;

FIG. 4B is an enlargement of an exemplary releasable locking mechanism for the security box shown in FIG. 2 and showing the releasable locking mechanism in an unlocked condition;

FIG. 5A is an isometric view of an alternate security box which also uses a releasable locking mechanism and a security tag thereon and which also contains digital medium, e.g., CD ROM or DVD, that itself includes an RFID content tag and wherein the alternate security box is shown in a locked condition;

FIG. 5B is an isometric view of the alternate security box of FIG. 5A showing the releasable locking mechanism in an unlocked condition and with the digital medium, e.g., CD ROM or DVD, being removed therefrom;

FIG. 7A is a cross-sectional view of the releasable locking mechanism taken along line 7A-7A of FIG. 6A;

FIG. 7B is a cross-sectional view of the releasable locking mechanism taken along line 7B-7B of FIG. 6B and showing how application of a requisite magnetic field interacts with the releasable locking mechanism to permit the slider portion to be slid;

FIG. 7C is a cross-sectional view of the of the releasable locking mechanism taken along line 7C-7C of FIG. 6B and showing how the pegs in the slider portion have been removed from the tongue in the case, enabling the lid to be rotated around the hinge;

FIG. 7D is a cross-sectional view similar to the view of FIG. 7C showing the lid being rotated about the hinge to provide access to the contents of the alternative security box;

DETAILED DESCRIPTION OF THE INVENTION

The invention of the present invention is envisioned to be used on any device that uses an existing lockable casing to secure the product. Non-limiting examples may include keys, PC cards, video games, or jewelry, etc. The majority of this disclosure concerns with applying this inventive concept towards securing DVD or CD media, but it is understood and contemplated that this technology could be employed to other technologies such as the above mentioned keys or video games.

Figure 1:
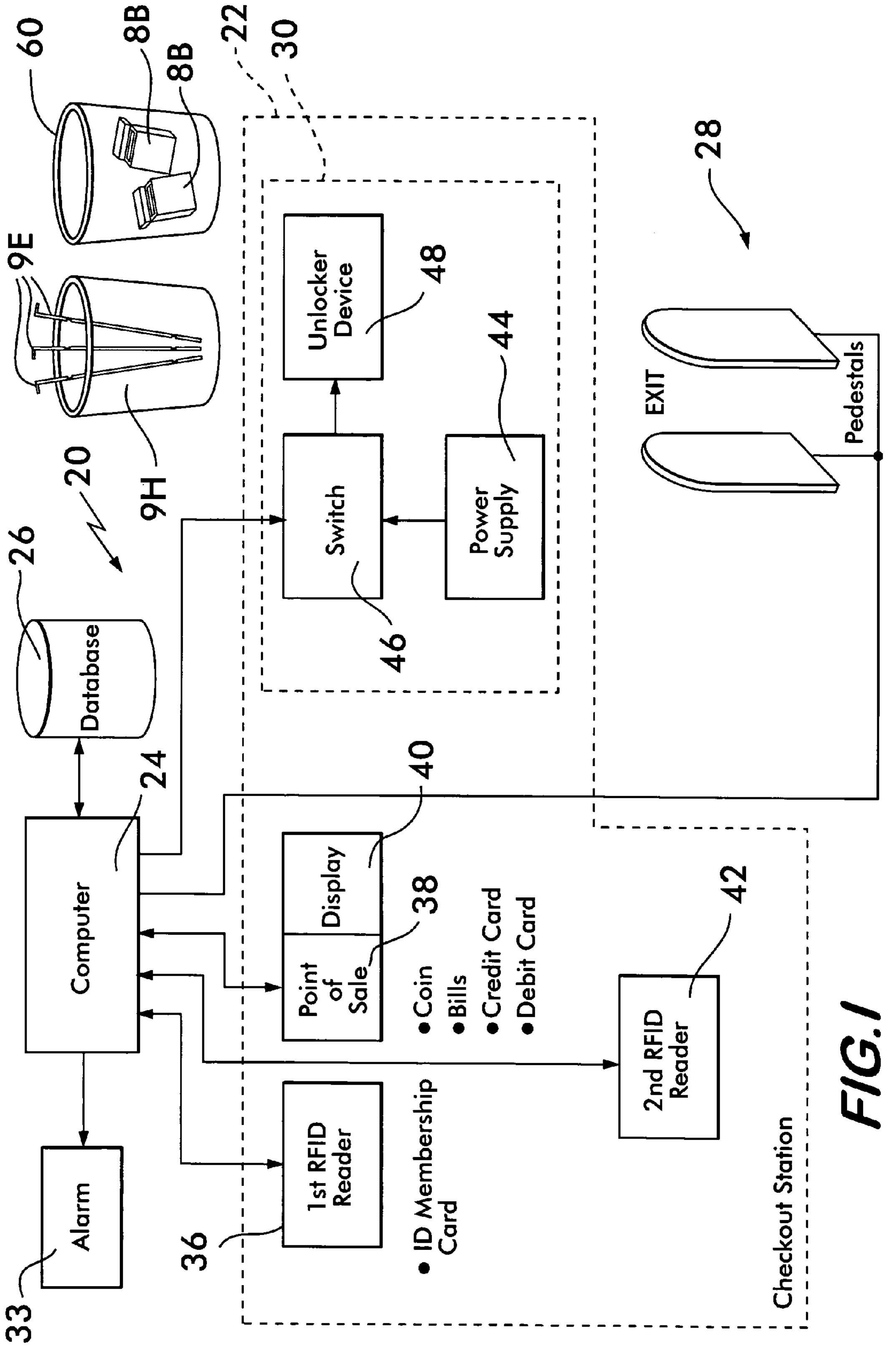
FIG. 1 is a functional diagram of the system of the present invention.

The system 20 of the present invention is shown in FIG. 1 and basically comprises a check-out station 22, a computer 24, database 26 and pedestals 28. The check-out station 22 provides for an automated method whereby a patron presents the digital media and performs a self-check-in without the need for any store employee assistance. The check-out station 22 communicates with the computer 24/database 26 for storing status information about the digital media 2 to be removed; the check-out station 22 also comprises an unlocker 30 that unlocks the digital media container. If a valid rental (or purchase) occurs, the computer 24 controls the "unlocking" of the digital media container as well as the de-activation of an alarm 33 that is triggered by detection at the pedestals 28. The pedestals 28 comprise antennas and a tag reader (e.g., an RFID reader). As will be discussed in detail later, the unlocker 30 may comprise a power supply 44, a switch 46 and an unlocker device 48 (e.g., a magnet or electromagnet, etc.) although this is by way of example only and many other unlocker 30 configurations fall within the broadest scope of this invention.

In order to understand the system 20 operation, it is necessary to discuss how the particular digital media, e.g., CD ROMs (hereinafter "CDs") or DVDs, are provided to the patron for rental or sale for use with the system 20.

Figure 2:
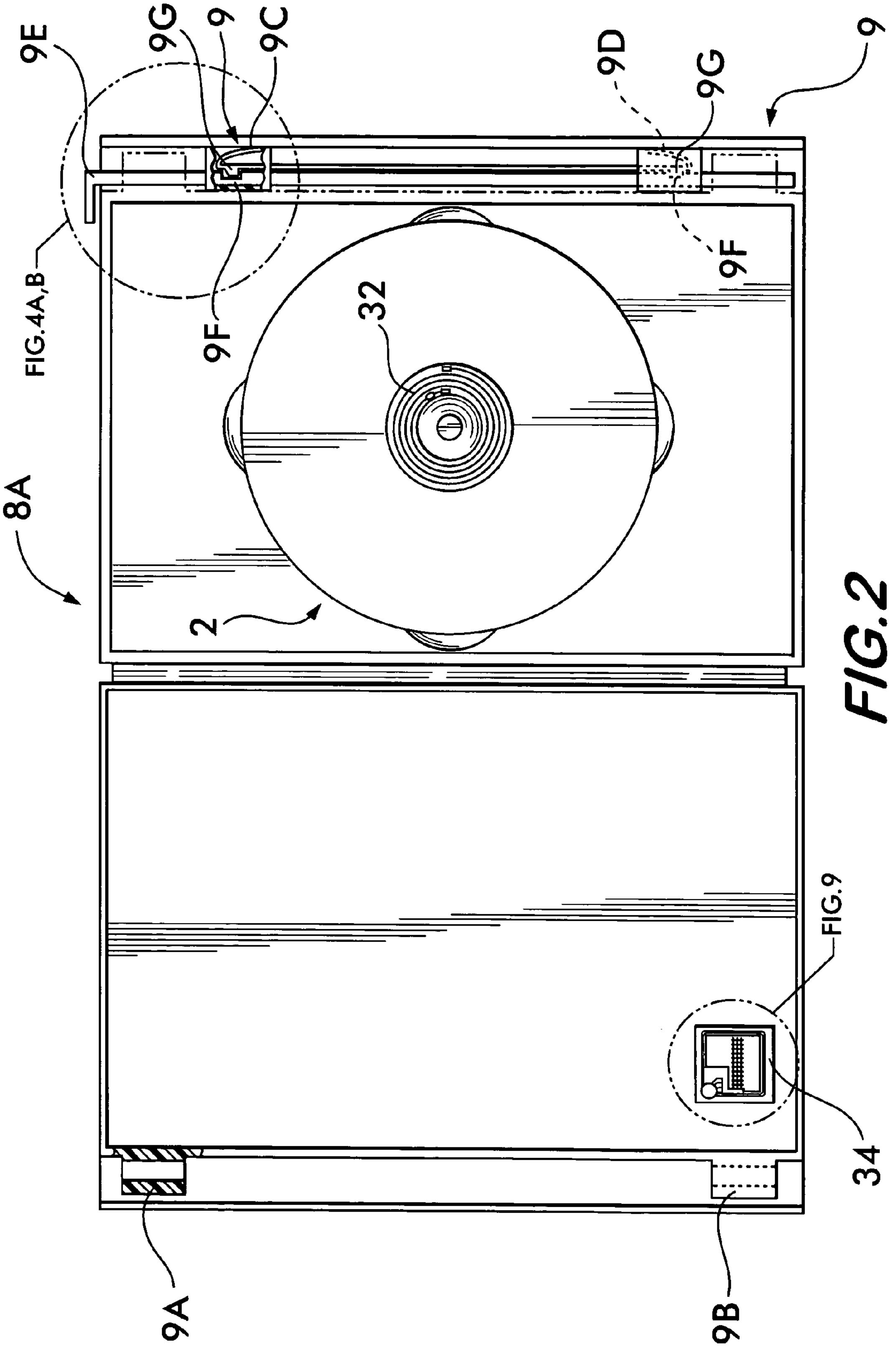
FIG. 2 is a top plan view of an opened security box which uses a releasable locking mechanism and a security tag and which also contains digital medium, e.g., CD ROM or DVD, that itself includes an RFID content tag.

As shown in FIGS. 2 and 3, the digital media 2, CD or DVD, comprises an ID tag 32, most preferably, an RFID (radio frequency identification) tag. RFID tags are disclosed in, by way of example only, U.S. Pat. No. 6,025,780 (Bowers) and U.S. Pat. No. 6,195,006 (Bowers et al.), both of which are incorporated by reference herein, and are designed to give detailed information about the product when the tag 32 is activated. To secure RFID tags directly to digital media 2, an annular tag construction is preferred since it can be secured to the clear plastic hub 2A that surrounds the hole of the CD/DVD and which is not read by the CD/DVD player. By way of example only, one such annular RFID tag 32 is sold under the mark CIRCULATION CIRCUIT® by the Assignee of the present application, namely, Checkpoint Systems, Inc. This RFID tag, hereinafter referred to as "RFID content tag" 32, stores details about the particular digital media in its RFID integrated circuit. For example, the name of the media (e.g., title, song names, movie name, author, singer, production company) and/or a serial number, or any other information that is pertinent to that digital media is stored in the RFID content tag 32. Such information can be used for inventory, collection management and store operation efficiency statistics, or any other useful task information. In this manner, the identity of the digital media 2 can be obtained simply by having an RFID reader, tuned to the frequenc(ies) of the RFID content tag 32, activate the RFID content tag 32 to elicit that information. Moreover, if the digital media 2 is stored in an opaque container (e.g., a security box, as will be discussed in detail next), there is no need to remove the digital media 2 to identify what it is.

As mentioned earlier to deter theft, most digital media 2 is now placed within a security box that cannot be opened unless a proper rental or purchase is performed. By way of example only, two types of security boxes are shown for use in the system 20 but it should be understood that the system 20 is not limited in any way to only these two types of security boxes.

FIG. 2 depicts an exemplary security box 8A that opens and closes like a book and which includes a releasable locking mechanism 9. This type of security box 8A is usually opaque and therefore the patron has to rely on any printing or labels on the outside of the security box 8A to determine the content of the security box 8A unless and until the patron can place the security box 8A near an RFID reader that will activate the RFID content tag 32 to reveal the contents. In order for a patron to open the security box 8A, he/she must perform a valid rental/purchase transaction, in which case the patron then places the security box 8A into the unlocker 30 that opens a releasable locking mechanism 9 since a valid rental or purchase has occurred.

For example, as shown most clearly in FIGS. 4A-4B, the releasable locking mechanism 9 may comprise a pair of sleeves 9A/9B, a pair of locking tongues 9C/9D and a locking bar 9E; the locking bar comprises a pair of notches 9F that correspond to a pair of protrusions 9G in the tongues 9C/9D. With the security box 8A closed, and the locking bar 9E slid downward through the sleeves 9A/9B, the protrusions 9G are biased into the notches 9F, thereby locking the security box 8A closed. Application of the requisite magnetic field from an unlocker device 48 (e.g., using a magnet 10, see FIG. 4B) of the unlocker 30, pulls the ferromagnetic tongues 9C/9D toward the unlocker device 48, thereby disengaging from the notches 9F and allowing the locking bar 9E to be slid upward in the direction of arrow 11. The patron removes the bar 9E, places it into a retrieval bin 9H (see FIG. 1) and then proceeds with the rented/purchased digital media 2 to the exit.

Figure 9:
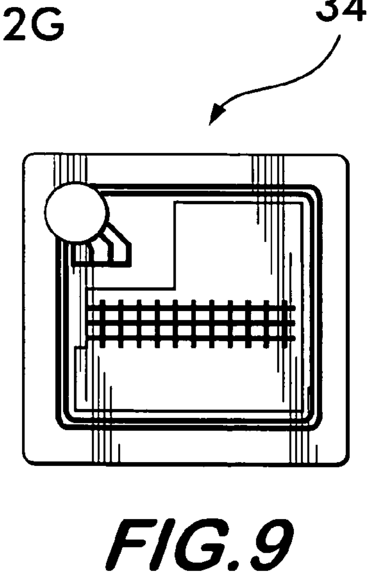
FIG. 9 is an enlarged top plan view of an exemplary security tag for use on/in in the security boxes used in the system of the present invention.

As used with the system 20 of the present invention, the security box 8A itself comprises a security tag 34 (FIG. 9). The security tag 34 can be either an EAS tag or an RFID tag. These tags can operate in the frequency ranges set forth below:

| EAS Operation | | RFID Operation | |
|---|---|---|---|
| Low Frequency (LF) | 5 kHz-12 kHz | Low Frequency (LF) | 100 kHz-400 kHz |
| | | High Frequency (HF) | 2 MHz-14 MHz |
| Acousto-Magnetic (AM) | 50 kHz-70 kHz | Ultrahigh Frequency (UHF) | 860 MHz-930 MHz |
| Radio Frequency (RF) | 2 MHz-14 MHz | Microwave Frequency | 2.3 GHz-2.6 GHz |

The security tag 34 provides theft deterrent in that if the security box 8A is attempted to be removed from the store without a valid rental or purchase, not only will the thief be unable to open the security box 8A to remove the digital media 2, but once he/she arrives at the pedestals 28, they will activate the alarm 33 upon detecting the presence of the EAS or RFID security tag 34. In contrast, if the valid rental or purchase has occurred, the pedestals 28 will not activate the alarm 33 as the patron passes through them with the security box 8A. By way of example only, the security tag 34 may be implemented using the security tag disclosed in U.S. Pat. No. 5,081,446 (Gill, et al.) whose entire disclosure is incorporated by reference herein and which is owned by the same Assignee, namely, Checkpoint Systems, Inc., as the present application.

FIGS. 5A-5B depict an alternate security box 8B that comprises a hinged edge that also comprises a locking mechanism 11 (FIGS. 6A-6B) that can be locked or unlocked to permit removal of the digital media 2 which is stored in a conventional jewel case 3. This type of security box 8B is usually transparent so that the patron, as well as the store employee, can readily see the CD or DVD directly; placing the security box 8B near an RFID reader will activate the RFID content tag 32 to reveal and confirm the contents of the CD or DVD. In order for a patron to open the security box 8B, he/she must also perform a valid rental/purchase transaction, in which case the patron, with the security box 8B then places the security box into the unlocker 30 (see FIGS. 10-11 for example) that opens the locking mechanism 11. The patron then removes the jewel case 3 from the security box 8B, places the security box 8B in a retainer bin 60 (see FIG. 1) and then proceeds with jewel case 3 to the exit. As used with the system 20 of the present invention, the security box 8B itself also comprises the security tag 34. The security tag 34 can be either an EAS tag or an RFID tag. These tags can operate in the frequency ranges set forth in the previous table.

Figures 6A, 6B:
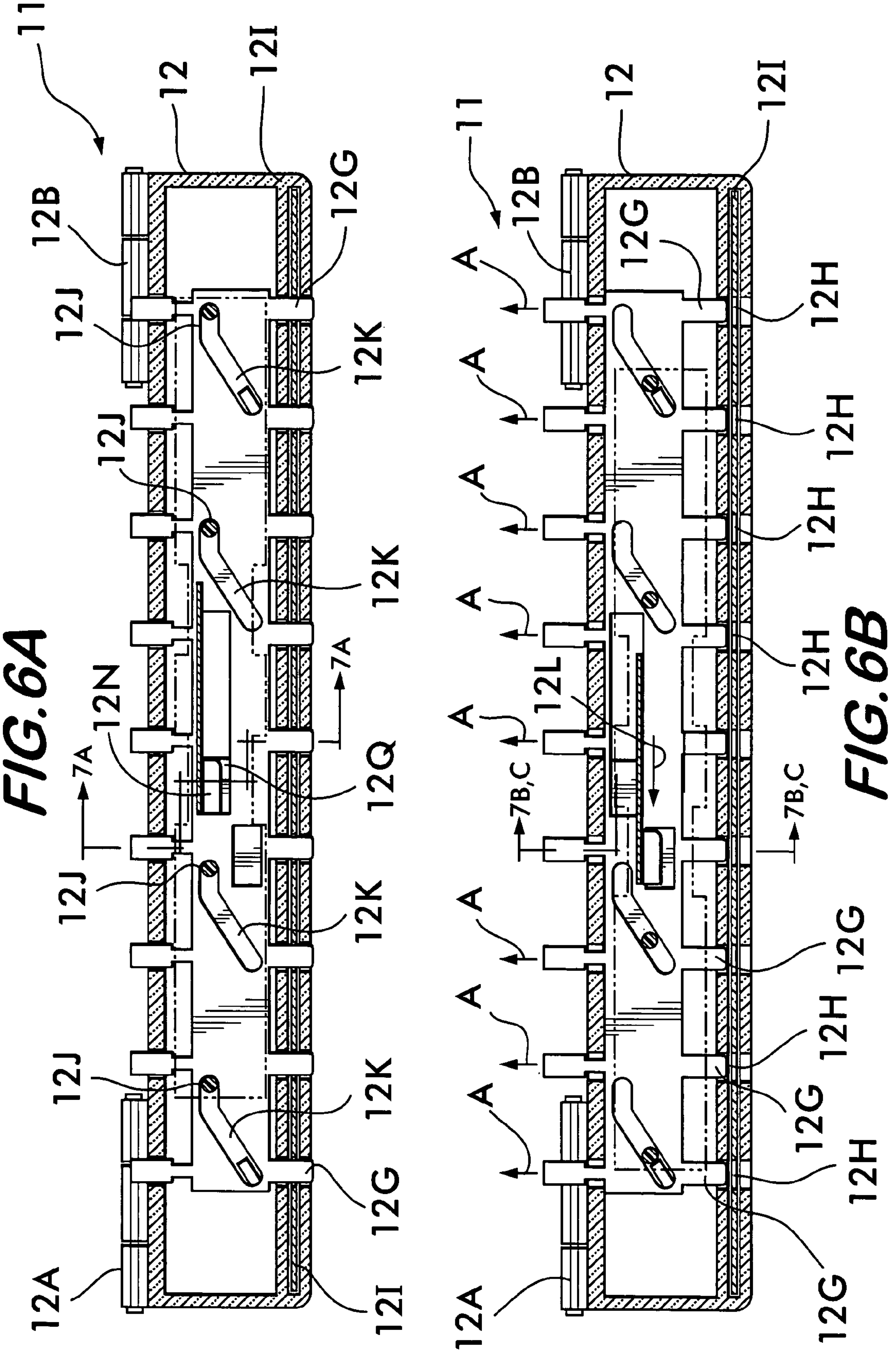
FIG. 6A is an enlarged cross-sectional view of the releasable locking mechanism taken along line 6A-6A of FIG. 5A shown in a locked condition.
FIG. 6B is a view similar to FIG. 6A but showing the releasable locking mechanism in an unlocked condition, with the slider portion moved to the left.
Figure 8:
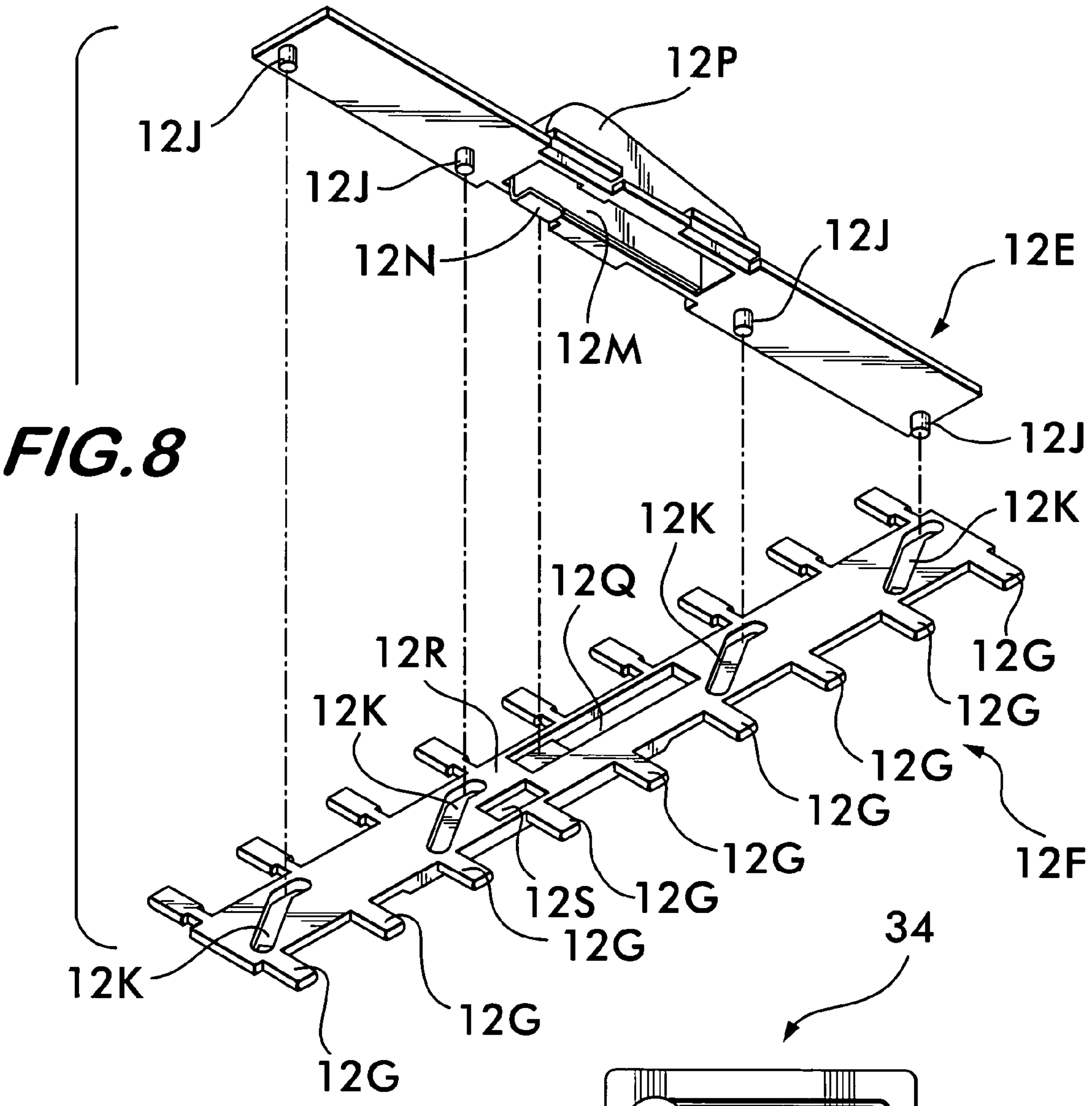
FIG. 8 is an exploded isometric view of the slider portion showing an upper driver portion and a lower peg rack portion.

In particular, the security box 8B comprises a lid 12 that is hinged 12A/12B to the casing 12C. The releasable locking mechanism 11 comprises a slider portion 12D (FIG. 8) that comprises an upper driver portion 12E and a lower peg rack portion 12F. When the locking mechanism 11 is locked, the pegs 12G pass through openings 12H in a tongue portion 121 of at the opening of the security box 8B. The vertical arrows in FIG. 5A indicate the direction that the pegs 12G move in order to unlock the lid 12 from the casing 12C. In order for the pegs 12G to move out of the openings 12H, the lower peg rack portion 12F needs to be displaced upward in the direction of arrows A (FIG. 6B); the lower peg rack portion 12F is driven upward by having pegs 12J (FIGS. 6A, 6B and 8) slide within the slots 12K in the lower peg rack portion 12F when the upper driver portion 12E is displaced to the left in the direction of arrow 12L in FIG. 6B. Thus, it should be understood that motion of the upper driver portion 12E is horizontal in FIGS. 6A-6B, whereas motion of the lower peg rack portion 12F is vertical in FIGS. 6A-6B. Motion of the upper driver portion 12E can be only be achieved when the lid 12 is disposed adjacent the unlocker device 48. As shown most clearly in FIGS. 7A-7C, a ferromagnetic member 12M having a projection 12N is positioned within a fairing 12P. When the releasable locking mechanism 11 is locked, the projection 12N is trapped within a cavity 12Q (FIGS. 6A and 7A), preventing any displacement of the upper driver portion 12E in the direction of arrow 12L. However, when the fairing 12P is positioned adjacent a the unlocker device 48 (e.g., magnet M with the appropriate magnetic field), as shown in FIG. 7B, the projection 12N is pulled out of the cavity 12Q (FIG. 7B) in the direction of arrow 12T, thereby allowing the user to slide the fairing 12P in the direction of the arrow 12L (FIGS. 5A and 6B) which causes the projection 12N to ride along the surface of the lower peg rack portion 12R (FIG. 8) while the pegs 12J displace the lower peg rack portion 12F upward in the direction of the arrows A (FIGS. 5A and 6B). Continued displacement of the fairing 12P in the direction of the arrow 12L eventually causes the projection 12N to enter a second cavity 12S. The lid 12 is then unlocked and the user can rotate it upward as shown in FIG. 7D to remove the contents. It should be noted that the user can manually re-lock the lid 12 by simply closing the lid 12 and sliding the fairing 12P in the direction opposite to the arrow 12L which causes the projection 12N to exit the second cavity 12S and to return to the first cavity 12Q where the releasable locking mechanism 11 is once again locked.

Figure 10:
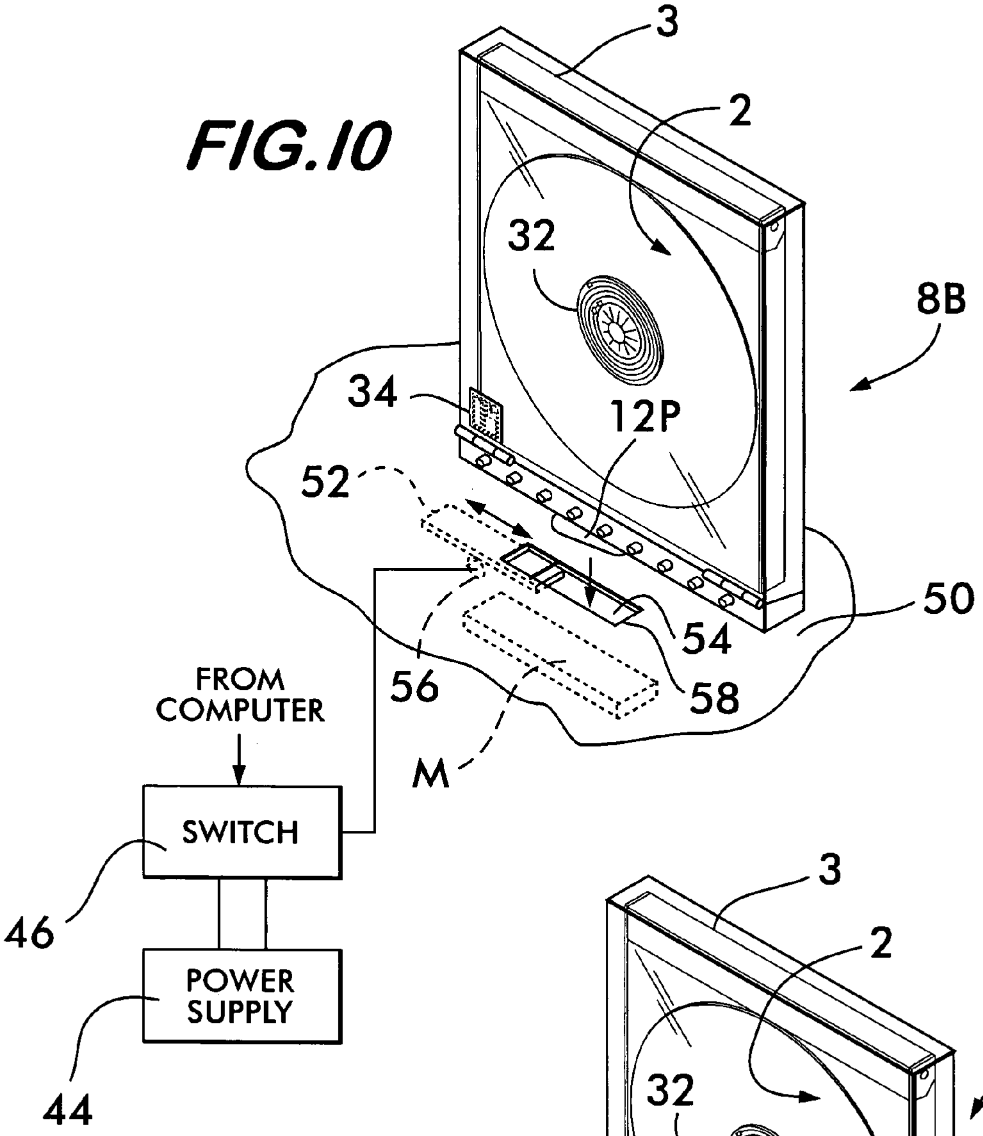
FIG. 10 is an isometric view of the alternative security box being applied to the unlocker, shown partially, and wherein an aperture is revealed to permit the requisite magnetic field to interact with the releasable locking mechanism.
Figure 11:
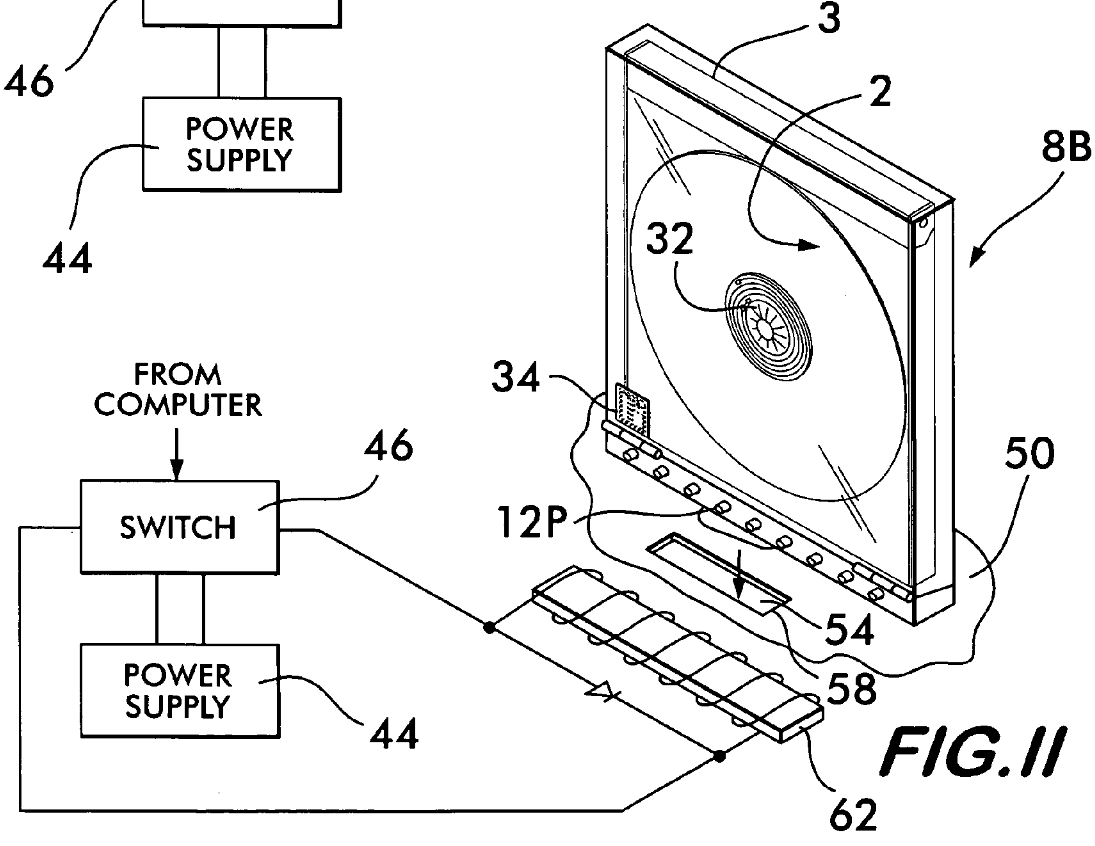
FIG. 11 is isometric view of the alternative security box being applied to an alternative unlocker, shown partially, and wherein an electromagnetic is energized to generate the requisite magnetic field to interact with the releasable locking mechanism.

FIGS. 10-11 provide exemplary configurations for the unlocker device 48 of the unlocker 30 that can be used with the security boxes 8A/8B or any other type of magnetically-controlled security box. The alternate security box 8B is shown by way of example only in FIGS. 10 and 11. In FIG. 10, the unlocker device 48 comprises a surface 50 that includes a displaceable portion 52 that can be moved to form a cavity 54 and to expose the magnet M located therein. The displaceable portion 52 is driven by an actuator 56 controlled by the computer 24. Thus, if a valid purchase or rental occurs, the computer 24 activates the actuator 56 to move the displaceable portion and expose the magnet M. The patron is then prompted to position the security box 8B with the lid 12 facing downward with the fairing 12P placed into the cavity 54. Exposure to the magnet M causes the projection 12N to be pulled out of the cavity 12Q (as discussed previously) and the patron is prompted to slide the security box 8B to the right so that the fairing 12P impacts the side 58 of the cavity 54, thereby causing the upper driver portion 12E to be moved in the direction of the arrow 12L and opening the security box 8B. The patron then removes the jewel case 3 and places the empty security box 8B into a bin 60 (FIG. 1). Other variations to this include having a magnet that is displaceable and which is controlled by the computer 24. For example, the magnet can be coupled to an actuator controlled by the computer 24. In its normal position, the magnet is positioned in lower elevation, away from the surface of where the security box 8A/8B is placed by the patron. If a valid sale or rental occurs, the computer 24 drives the magnet upward to be proximate the surface where the security box 8A/8B is located to unlock the releasable locking mechanism 9 or 11.

FIG. 11 depicts an unlocker device 48 that utilizes an electromagnet 62 rather than a permanent magnet. In this configuration there is no displaceable portion 52 nor any actuator 56. Instead, the cavity 54 is always open but the electromagnet 62 is only energized by the computer 24 where a valid purchase or rental has occurred. If a valid purchase or rental has occurred, the patron is prompted to position the security box 8B with the lid 12 facing downward with the fairing 12P placed into the cavity 54. The patron then slides the security box 8B in order to move the fairing 12P, as discussed previously with regard to FIG. 10. Similarly, this alternative unlocker device 48 using the electromagnet 62 can also be used to unlock the releasable locking mechanism 9 of security box 8A.

Figures 12, 13:
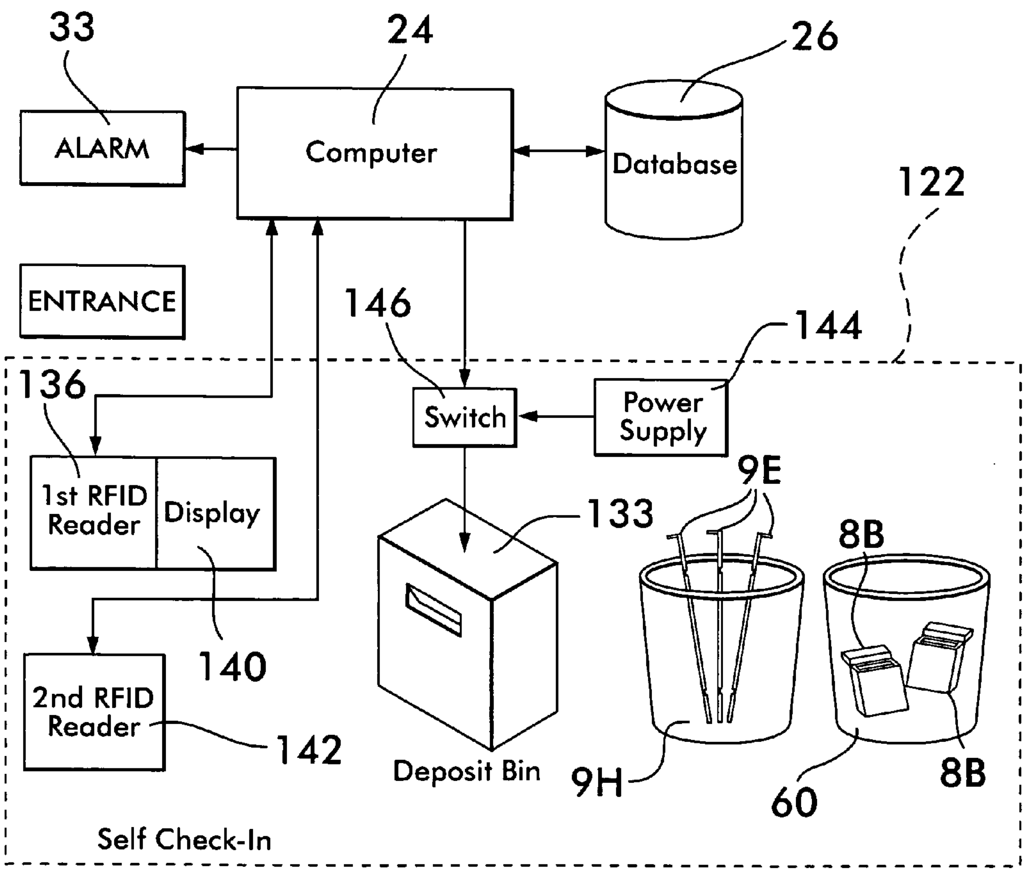
FIG. 12 is an exemplary record of a database on the system database for storing the status and related information of every digital media being sold or licensed using the present invention.
FIG. 13 is an exemplary check-in system that can be used in conjunction with the check-out system.

FIG. 12 provides an example of the data stored in the database 26 in order for controlling the unlocking of the security box 8A/8B. As shown, each database record comprises digital media identification indicia (serial number, title, author, etc.). The identification of the security box, a status indicator (valid or invalid), patron identification indicia, date/time of rental and date/time of return. Except for the date/time returned, all of this information is automatically entered into the database 26 during the check-out at the checkout station 22. The default setting for the status indicator is "invalid." If the status indicator for any security box is "invalid", the pedestals 28 will set off the alarm if the security box passes through them. In order for the status indicator to be changed to "valid," there must be a valid purchase or rental that occurs at the checkout station 22.

Figure 14:
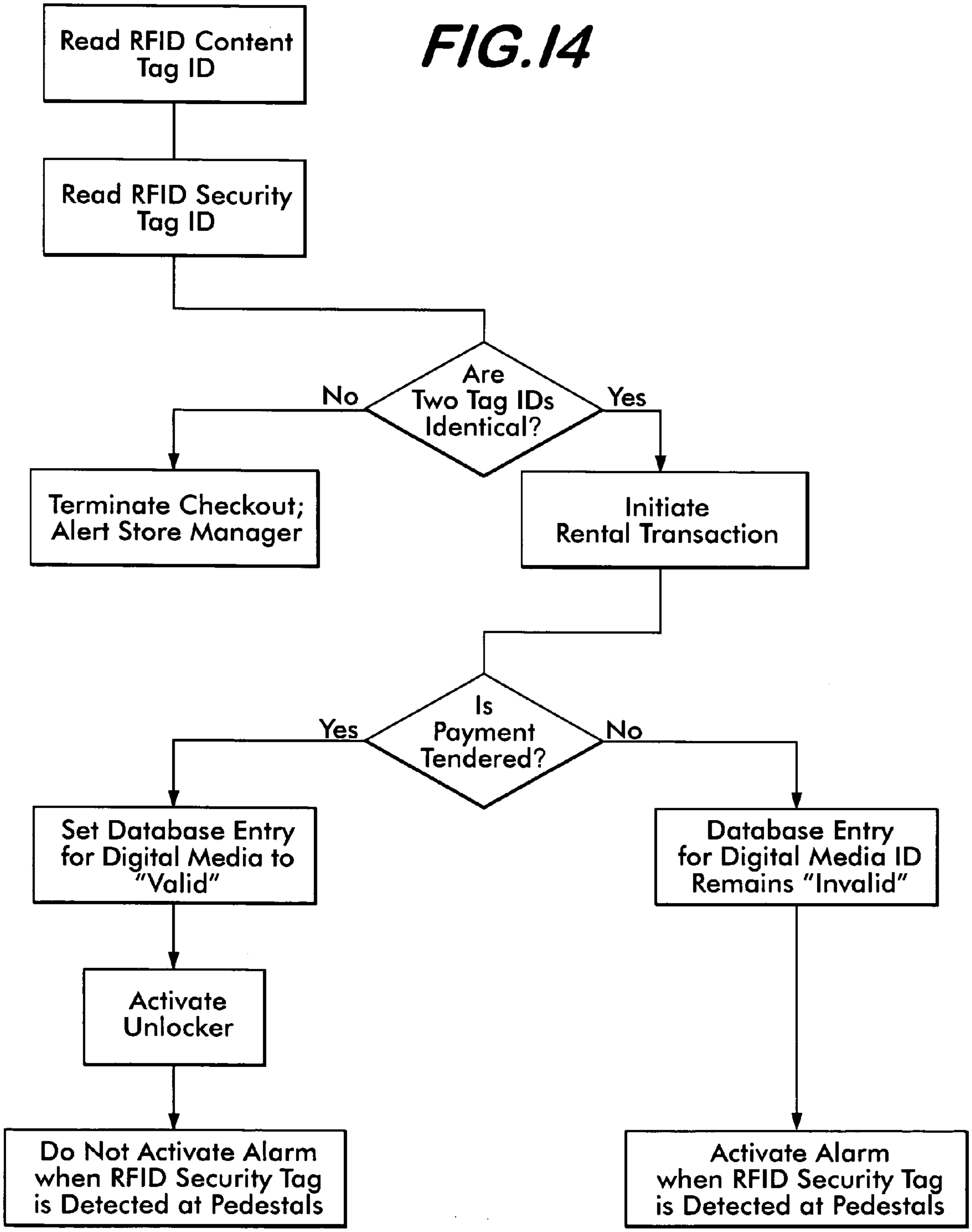
FIG. 14 is a flow diagram for the check-out process of the system of the present invention where a digital media content tag and a security tag with the security box are used.
Figure 15:
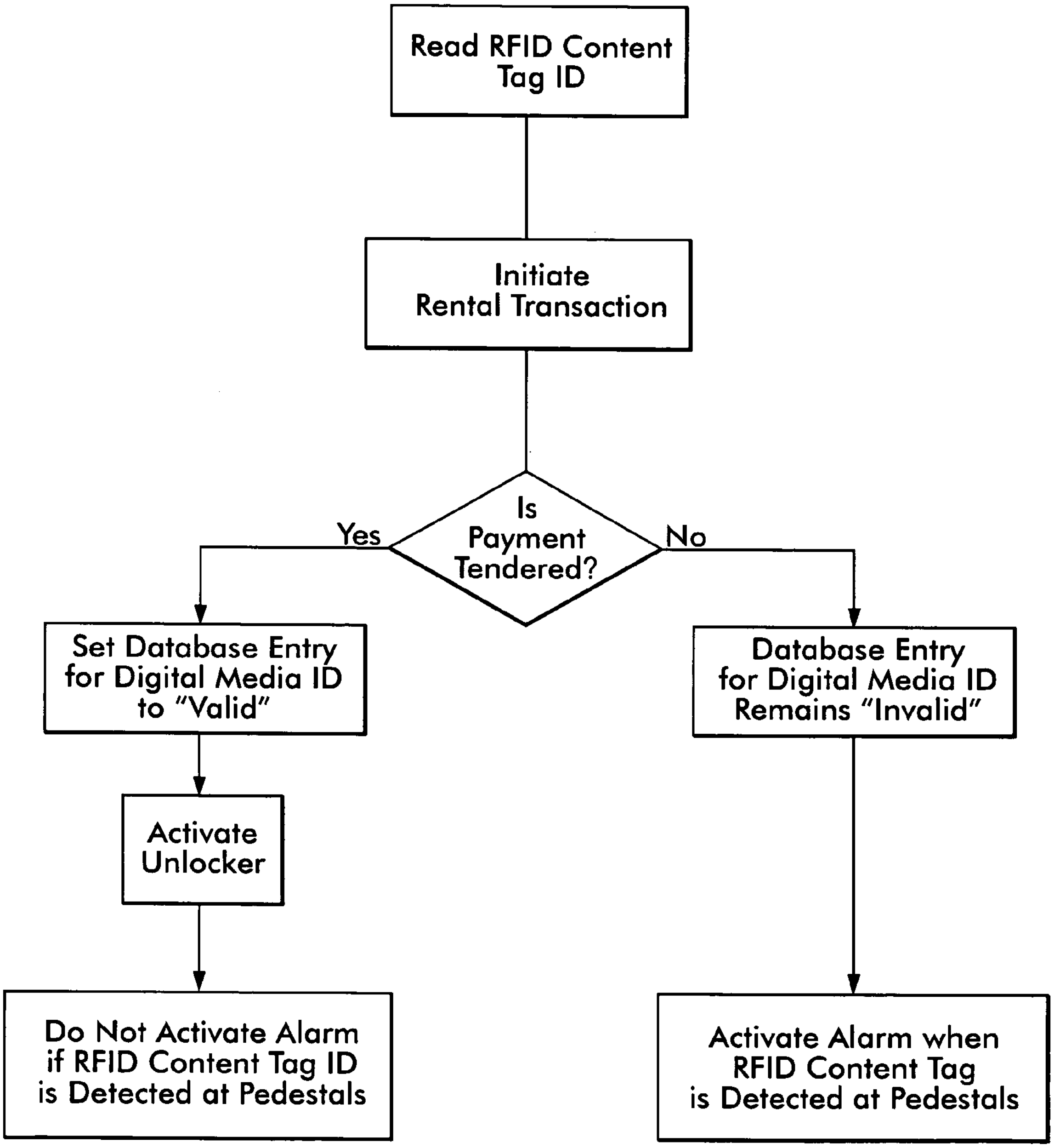
FIG. 15 is a flow diagram for the check-out process of the system of the present invention where only one tag is used.
Figure 16:
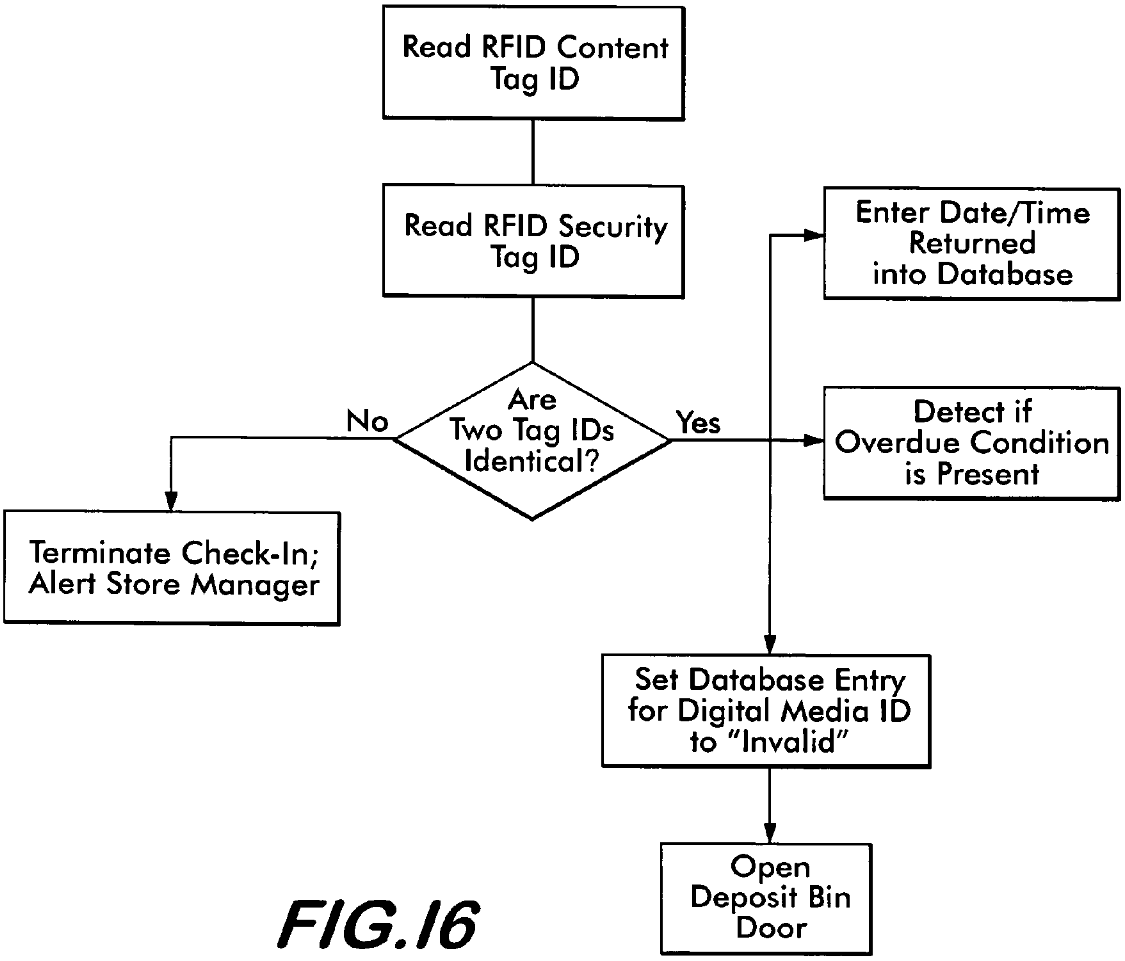
FIG. 16 is a flow diagram for the check-in process of the system of the present invention where the patron returns a security box along with the digital media.
Figure 17:
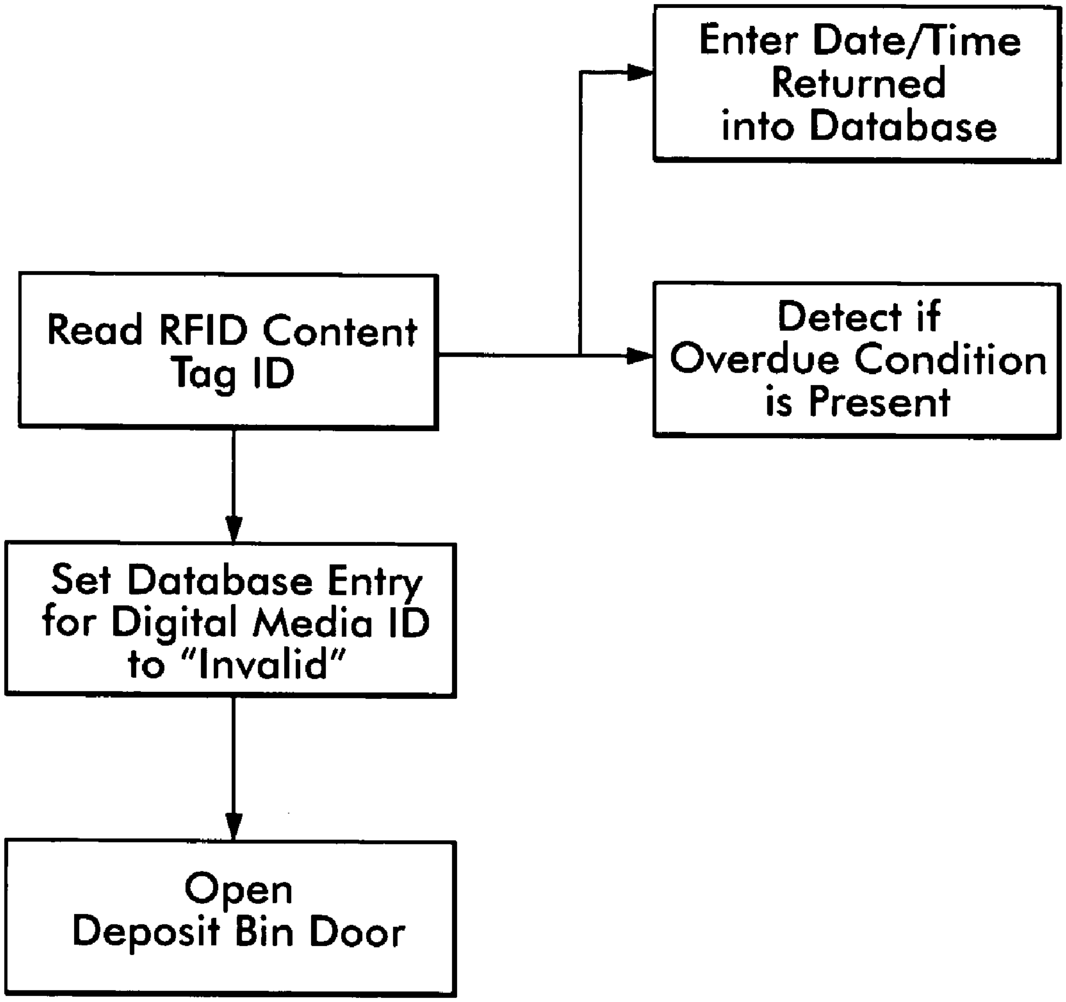
FIG. 17 is a flow diagram for the check-in process of the system of the present invention where the digital media is restored to the alternative security box.

FIG. 14 provides a flow diagram of the self-check-out procedure using this two tag configuration and FIG. 16 provides a flow diagram of the self-check-in procedure using this two tag configuration. If, on the other hand, the RFID content tag 32 alone is used, with no EAS/RFID security tag 34 associated with the security box 8A/8B, then FIGS. 15 and 17 provide the self-check-in procedure and the self-check-out procedure, respectively, for such a single tag configuration.

In particular, once a patron has selected a security box 8A/8B from the business inventory, the patron proceeds to the checkout station 22. The checkout station 22 (FIG. 1) may comprise a first RFID reader 36, a point-of-sale (POS) device 38 (e.g., a coin/bill device, a credit/debit card device, etc.), a display 40, a second RFID reader 42, a power supply 44, a switch 46 and the unlocker device 48 and most of which are coupled to the computer 24. It should be noted that the power supply 44, switch 46 and unlocker device 48 can be integrated to form the unlocker 30. Furthermore, all of the components of the checkout station 22 can form an integrated station such as that sold under mark RAPICIRC® III, or the self-checkout station sold under the mark INTELLIGENT LIBRARY SYSTEM® by the Assignee of the present application, namely, Checkpoint Systems, Inc. of Thorofare, N.J.

Upon arriving at the checkout station 22, the patron places the security box 8A/8B on the designated location for the digital media 2, which is proximate the first RFID reader 36 (which is not visible to the patron). The RFID reader 36 energizes the RFID content tag 32 and retrieves all of the pertinent data about the digital media 2 being rented or purchased. This information is displayed on the display 40 to the patron who is then instructed to verify that this is the digital media that he/she has selected. Similarly, where the content tag 32 is an EAS tag, the reader 36 would comprise an EAS tag reader (e.g., Checkpoint's TR4024 pulse-listen reader).

The patron can place his/her membership card adjacent the RFID reader 36 and the RFID reader 36 can determine the patron's pertinent information and membership account. This information can be displayed on the display 40 and prompt the user to verify the information (and/or make any corrections if necessary). Once all of this data is entered correctly into the database 26, the computer 24 activates the second RFID reader 42 that energizes the RFID security tag 34 to obtain the identification information about the security box 8A/8B which should have common information with that obtained from the first RFID reader 36, e.g., title, author, etc. of the digital media 2. According to FIG. 14, the computer checks to verify if the digital media identification indicia correspond to the security box identification indicia; if not, the check-out process is terminated and the business or store manager is alerted; if the two tags' data correspond, the computer 24 initiates the sale/rental transaction itself. In particular, the POS device 38 is activated and the display 40 prompts the user to tender the proper payment and allows the user to deposit coins and/or bills into the appropriate portions of the POS device 38; in addition, the POS device 38 permits the use of credit cards or debit cards which can be received into the POS device 38 (e.g., conventional credit card or debit card readers). In accordance with FIG. 14, if the payment is tendered, the computer 24 changes the default status identifier from "invalid" to "valid" and immediately enables the switch 46 which powers the unlocker device 48. As discussed previously, the patron is prompted by the display 40 on how to position the security box 8A/8B to have it unlocked. Because the computer 24 has changed the status identifier to "valid" when the patron passes through the pedestals 28, even though the detectors in the pedestals 28 detect the RFID security tag 34, the alarm 33 is not activated because of the "valid" identifier in the database 26. Conversely, if no payment is tendered, the status identifier remains "invalid" and when the detectors in the pedestals 28 (e.g., Checkpoint Strata™ PX pedestals, etc.) detect that particular RFID security tag 34 and inform the computer 24, the computer 24 sets off the alarm 33.

It should be noted that the verification of the digital media 2 identification indicia correspond to the security box identification indicia is only necessary where the security box 8A is used since the security box 8A is typically opaque and contains printed material on its cover regarding the digital media 2 contained therein. On the other hand, where the alternate security box 8B is used, and which is typically transparent, there is no need to associate any particular security box 8B with a certain digital media 2.

Also, it should be understood that where the security tag 34 is an EAS tag, the second reader 42 would comprise an EAS tag reader (e.g., Checkpoint's TR4024 pulse-listen reader).

As shown in FIG. 15, where there is only the RFID content tag 32 used, only the first RFID scanner 36 is required. In that scenario, once the digital media 2 identification data is read into the database 26, the computer 24 initiates the sale or rental transaction and the process is similar to that discussed with regard to FIG. 14.

As mentioned previously, one of the problems patrons who rent digital media may encounter is the accrual of late fees even though they are certain that they returned the digital media to the borrowed facility well before the return time deadline. The solution to this problem is an automated check-in procedure for patrons at the entrance. FIG. 13 provides such a check-in station 122 that comprises a first RFID reader 136, a display 140 and a second RFID reader 142. The check-in station 122 also comprises a deposit bin 133, as well the bins 9H and 60. The RFID readers 136/142 are both coupled to the computer 24. In accordance with FIG. 16, when the patron returns the security box 8A containing the corresponding digital media 2, the patron is instructed by the display 140 to conduct a check-in procedure. The patron is precluded from trying to simply drop the returned security box 8A into the deposit bin 133 because the opening to the deposit bin 133 is locked and can only be opened by the computer 124 when the check-in procedure is concluded. In particular, the patron is prompted to place the security box 8A onto the designated location at the check-in station 122 which is proximate the first and second RFID readers 136/142. The RFID reader 136 energizes the RFID content tag 32 and reads the pertinent data about the digital media 2. Next, the computer 24 energizes the second RFID reader 142 to determine the security box 8A identification data. If this data corresponds to what has previously been stored in the database 26 when this security box 8A/digital media 2 was validly rented, the computer 24 enters the date/time returned into the database record (FIG. 12). The computer 24 then determines if there is an overdue condition that will be charged to the patron for returning the rented digital media. The computer 24 then changes the status identifier to "invalid" and then commands the switch 146 (which provides power from a power supply 144) to energize an actuator (not shown) to open the door to the deposit bin 133. If, on the other hand, the data of the digital media 2 and the security box 8A do not correspond, the check-in procedure is terminated and the store manager is alerted. As can be appreciated, if the patron concludes a successful check-in process, the database 26 now reflects the actual return date/time of the rented digital media, thereby preventing any possible accrual of late fees if the returned digital media were to now be used by someone else. Once the digital media 2/security box 8A are in the deposit bin, store employees can then insert a locking bar 9E from the bin 9H into the locking mechanism 9 and restore the security box 8A on the shelf.

Where the patron is returning only the digital media 2 inside the corresponding jewel case 3, there is only one tag, namely, the RFID content tag 32. FIG. 17 depicts the check-in process for that scenario. In particular, when the patron places the jewel case 3 at the designated location at the check-in station 122 and the first RFID reader 136 reads the digital media data, the computer 24 enters the date/time returned into the database record (FIG. 12). The computer 24 then determines if there is an overdue condition that will be charged to the patron for returning the rented digital media. The computer 24 then changes the status identifier to "invalid" and then commands the switch 146 to open the door to the deposit bin. Once the jewel case 3 containing the digital media 2 is dropped into the deposit bin 133, store employees can remove any of the unlocked security boxes 8B from the bin 60 and insert the jewel case 3 therein and then lock the security box 8B; the security box 8B containing the jewel case 3/digital media 2 can then be restored to the shelf.

The advantage of using this system 20 is that the media 2 (e.g., CD/DVD) remains secure and the security box 8A/8B remains unopened until a valid purchase or rental occurs. This decreases the risk of theft, improves the speed of processing material and managing the collection, which saves the rental facility money in employee hours and inventory shrinkage. It should be understood that it is within the broadest scope of the present invention 20 to use the content tag 32 for both digital media information identification, as well as for detection by the pedestals 28. In that situation, there would be security tag 34 used with the security box 8A/8B. While it is contemplated to use the RFID content tag 32 as the type of tag that the facility's antennas detect for security purposes also (e.g., unlawful removal from premises), structural limitations of these tags 32 may prevent the tag 32 from being used to emit a signal strong enough so that the security antennas in the pedestals 28 can receive a signal to sound an alarm in a reliable manner. Thus, RFID content tags 32 are commonly known as short-range tags when they are placed on material (e.g., CDs and DVDs) containing metal or ferrous content. To rectify this short range operation of the RFID content tag 32, the use of the RFID content tag 32 is combined with the use of the separate EAS or RFID tag 34 in the security box 8A/8B, or standard packing of the material (not shown) contained in a security box 8A/8B. In particular, the separate EAS or RFID tag 34 supports long range operation for detection by EAS or RFID antennas either around the business and at the pedestals 28 at the business exits.

Thus, the use of a two tag configuration, one RFID content tag 32 on the digital media 2 and one EAS/RFID tag 34 on the security box 8A/8B, can be used in the system 20 of the present invention, as discussed below.

It should be understood that the term display 40/140 is meant to cover any type of input/output device that permits the patron to perceive instructions, prompts and information from the computer 24 and to input information when requested/required. As a result, the display 40/140 can include speakers, monitors (including touch screens), television screens, etc., and includes keypads, keyboards, mouses, etc., that allow the patron to enter information.

It should also be understood that the checkout station 22 and the check-in station 122 are not limited to hard-wired configurations but can include wireless configurations such as (WIFI, Bluetooth, etc), optic protocols, or sonar protocols.

While the invention has been described in detail and with reference to specific examples thereof, it will be apparent to one skilled in the art that various changes and modifications can be made therein without departing from the spirit and scope thereof.

What is claimed is:

1. An automated self check-out system for digital media located in a facility where the digital media is sold to, or rented by, patrons, said system comprising:

a content tag secured to the digital media for containing identification data of the digital media; and a security box into which said digital media is disposed, said security box comprising a releasable lock that precludes access to the digital media contained therein until said releasable lock is unlocked;

a check-out station comprising:

at least one tag reader for obtaining said identification data from said content tag;

a computer coupled to a database, said database associating the digital media with patron identification;

a point of sale device, coupled to said computer, that permits the patron to tender payment for purchasing or renting the digital media, said computer modifying a status identifier of said digital media stored on said database based on said payment;

an unlocker coupled to said computer, said computer activating said unlocker whenever payment occurs; and pedestals, located at the exit of the facility, and coupled to the computer for detecting the presence of said content tag; and an alarm, coupled to said computer, that activates whenever said content tag is detected at said pedestals and said status identifier has not been modified.

2. The automated self check-out system of claim 1 wherein said at least one tag reader also reads a membership card provided by the patron for obtaining said patron identification.

3. The automated self check-out system of claim 1 wherein the digital media comprises a compact disk or digital video disk and wherein said content tag comprises an annular construction that is secured around a hub portion of the compact disk or digital video disk.

4. The automated self check-out system of claim 1 wherein said unlocker comprises a magnet comprising a requisite magnetic field that interacts with said releasable lock to unlock said releasable lock.

5. The automated self-check out system of claim 4 wherein said magnet is exposed or moved closely adjacent said security box when activated by said computer.

6. The automated self check-out system of claim 4 wherein said security box comprises a locking bar that can be removed once said releasable lock is unlocked.

7. The automated self check-out system of claim 4 wherein said security box comprises a lid and casing, said lid being locked to said casing by said releasable lock, and wherein a portion of said lid can be disengaged from said casing when said releasable lock is unlocked by said unlocker.

8. The automated self check-out system of claim 1 wherein said unlocker comprises an electromagnet that is activated by said computer, said electromagnet generating the requisite magnetic field that interacts with said releasable lock to unlock said releasable lock.

9. The automated self check-out system of claim 8 wherein said security box comprises a locking bar that can be removed once said releasable lock is unlocked.

10. The automated self check-out system of claim 8 wherein said security box comprises a lid and casing, said lid being locked to said casing by said releasable lock, and wherein a portion of said lid can be disengaged from said casing when said releasable lock is unlocked by said unlocker.

11. The automated self check-out system of claim 1 further comprising a check-in system, said check-in system comprising:

a second tag reader, coupled to said computer, for obtaining said identification data from said content tag when the patron is in the process of returning rented digital media to the facility;

a deposit bin having a portal whose access is controlled by said computer; and wherein said computer modifies said database records to include the date and time of return of the digital media, said computer permitting access through said portal when said date and time of return are entered into said database.

12. The automated self check-out system of claim 11 wherein said computer also checks to see if there are any late fees when the patron returns the rented digital media.

13. An automated self check-out system for digital media located in a facility where the digital media is sold to, or rented by, patrons, said system comprising:

a content tag secured to the digital media for containing identification data of the digital media; and a security box into which said digital media is disposed, said security box comprising a security tag and a releasable lock, said releasable lock precluding access to the digital media contained therein until said releasable lock is unlocked;

a check-out station comprising:

a first tag reader for obtaining said identification data from said content tag;

a computer coupled to a database, said database associating the digital media with patron identification;

a point of sale device, coupled to said computer, that permits the patron to tender payment for purchasing or renting the digital media, said computer modifying a status identifier of said digital media stored on said database based on said payment;

an unlocker coupled to said computer, said computer activating said unlocker whenever payment occurs; and pedestals, located at the exit the facility, and coupled to the computer for detecting the presence of said security tag; and an alarm, coupled to said computer, that activates whenever said security tag is detected at said pedestals and said status identifier has not been modified.

14. The automated self check-out system of claim 13 wherein said first tag reader also reads a membership card provided by the patron for obtaining said patron identification.

15. The automated self check-out system of claim 13 wherein the digital media comprises a compact disk or digital video disk and wherein said content tag comprises an annular construction that is secured around a hub portion of the compact disk or digital video disk.

16. The automated self check-out system of claim 13 wherein said unlocker comprises a magnet comprising a requisite magnetic field that interacts with said releasable lock to unlock said releasable lock.

17. The automated self-check out system of claim 16 wherein said magnet is exposed or moved closely adjacent said security box when activated by said computer.

18. The automated self check-out system of claim 16 wherein said security box comprises a locking bar that can be removed once said releasable lock is unlocked.

19. The automated self check-out system of claim 16 wherein said security box comprises a lid and casing, said lid being locked to said casing by said releasable lock, and wherein a portion of said lid can be disengaged from said casing when said releasable lock is unlocked by said unlocker.

20. The automated self check-out system of claim 13 wherein said unlocker comprises an electromagnet that is activated by said computer, said electromagnet generating the requisite magnetic field that interacts with said releasable lock to unlock said releasable lock.

21. The automated self check-out system of claim 20 wherein said security box comprises a locking bar that can be removed once said releasable lock is unlocked.

22. The automated self check-out system of claim 20 wherein said security box comprises a lid and casing, said lid being locked to said casing by said releasable lock, and wherein a portion of said lid can be disengaged from said casing when said releasable lock is unlocked by said unlocker.

23. The automated self check-out system of claim 13 further comprising a check-in system, said check-in system comprising:

a second tag reader, coupled to said computer, for obtaining said identification data from said content tag when the patron is in the process of returning rented digital media to the facility;

a deposit bin having a portal whose access is controlled by said computer; and wherein said computer modifies said database records to include the date and time of return of the digital media, said computer permitting access through said portal when said date and time of return are entered into said database.

24. The automated self check-out system of claim 23 wherein said computer also checks to see if there are any late fees when the patron returns the rented digital media.

25. A method for permitting a patron to automatically check-out digital media located in a facility where the digital media is sold or rentable, said method comprising the steps of:

securing a content tag to the digital media for containing identification data of the digital media therein and providing pedestals at an exit of the facility that can detect the passage of said content tag therethrough;

providing an alarm that can be activated when said pedestals detect the passage of said content tag therethrough;

disposing the digital media into a security box having a releasable lock that precludes access to the digital media contained therein until said releasable lock is unlocked;

wirelessly obtaining said identification data from said content tag by the patron;

obtaining patron identification data from the patron and associating the identification data with the patron identification data in a database;

receiving payment from the patron to either rent or purchase the digital media;

modifying a status identifier of said rented or purchased digital media stored on said database based on said payment and unlocking said releasable lock based on said payment;

deactivating said alarm when said pedestals detect the passage of said content tag therethrough and when said status identifier has been modified, or activating said alarm when said pedestals detect the passage of said content tag therethrough and when said status identifier has not been modified.

26. The method of claim 25 wherein said step of wirelessly obtaining said identification data from said content tag comprises providing an RFID reader and wherein said content tag is an RFID tag.

27. The method of claim 26 wherein said step of obtaining patron identification data comprises the patron presenting a membership card that can be read by said RFID reader.

28. The method of claim 25 wherein said step of unlocking said releasable lock comprises exposing or moving a magnet, having a requisite magnetic field, adjacent said security box to unlock said releasable lock.

29. The method of claim 25 wherein said step of unlocking said releasable lock comprises activating an electromagnet with the requisite magnetic field adjacent said security box to unlock said releasable lock.

30. The method of claim 25 further comprising the steps of:

wirelessly obtaining said identification data from said content tag when the patron arrives back at the facility to return said digital media;

storing the date and time of the return on said database; and permitting the patron to pass said returned digital media through a portal when said date and time of return are entered into said database.

31. The method of claim 30 further comprising the step of modifying said status identifier that would cause said alarm to activate.

32. The method of claim 30 further comprising the step of checking to see if there are any late fees when the patron returns the rented digital media.

33. A method for permitting a patron to automatically check-out digital media located in a facility where the digital media is sold or rentable, said method comprising the steps of:

securing a content tag to the digital media for containing identification data of the digital media therein and providing pedestals at an exit of the facility;

disposing the digital media into a security box having a releasable lock that precludes access to the digital media contained therein until said releasable lock is unlocked, said security box also comprising a security tag;

providing an alarm that can be activated when said pedestals detect the passage of said security tag therethrough;

wirelessly obtaining said identification data from said content tag by the patron;

obtaining patron identification data from the patron and associating the identification data with the patron identification data in a database;

receiving payment from the patron to either rent or purchase the digital media;

modifying a status identifier of said rented or purchased digital media stored on said database based on said payment and unlocking said releasable lock based on said payment;

deactivating said alarm when said pedestals detect the passage of said security tag therethrough and when said status identifier has been modified, or activating said alarm when said pedestals detect the passage of said security tag therethrough and when said status identifier has not been modified.

34. The method of claim 33 wherein said step of wirelessly obtaining said identification data from said content tag comprises providing an RFID reader and wherein said content tag is an RFID tag.

35. The method of claim 33 wherein said step of obtaining patron identification data comprises the patron presenting a membership card that can be read by said RFID reader.

36. The method of claim 33 wherein said step of unlocking said releasable lock comprises exposing or moving a magnet, having a requisite magnetic field, adjacent said security box to unlock said releasable lock.

37. The method of claim 33 wherein said step of unlocking said releasable lock comprises activating an electromagnet with the requisite magnetic field adjacent said security box to unlock said releasable lock.

38. The method of claim 33 further comprising the steps of:

wirelessly obtaining said identification data from said content tag and from said security tag when the patron arrives back at the facility to return said digital media;

comparing the identification data obtained from said content tag and from said security tag;

storing the date and time of the return on said database; and permitting the patron to pass said returned digital media through a portal when said date and time of return are entered into said database.

39. The method of claim 38 further comprising the step of modifying said stats identifier that would cause said alarm to activate.

40. The method of claim 38 wherein said step of comparing the identification data comprises alerting facility personnel if there is no match between said the identification data obtained from said content tag and from said security tag.

41. The method of claim 38 further comprising the step of checking to see if there are any late fees when the patron returns the rented digital media.

* * * * *